J. G. HANKS, DEC'D.
E. P. BROWN, ADMINISTRATRIX.
REGISTERING MECHANISM FOR RANGE FINDERS.
APPLICATION FILED OCT. 25, 1915.

1,286,608.

Patented Dec. 3, 1918.
2 SHEETS—SHEET 1.

J. G. HANKS, DEC'D.
E. P. BROWN, ADMINISTRATRIX.
REGISTERING MECHANISM FOR RANGE FINDERS.
APPLICATION FILED OCT. 25, 1915.

1,286,608.

Patented Dec. 3, 1918.
2 SHEETS—SHEET 2.

UNITED STATES PATENT OFFICE.

JOHN G. HANKS, DECEASED, BY ELIZA P. BROWN, ADMINISTRATRIX, OF OAKLAND, CALIFORNIA; SAID HANKS ASSIGNOR TO CALIFORNIA RANGE FINDER COMPANY, OF OAKLAND, CALIFORNIA, A CORPORATION OF ARIZONA.

REGISTERING MECHANISM FOR RANGE-FINDERS.

1,286,608.          Specification of Letters Patent.       Patented Dec. 3, 1918.

Original application filed December 17, 1907, Serial No. 406,915. Divided and this application filed October 25, 1915. Serial No. 57,887.

*To all whom it may concern:*

Be it known that I, ELIZA P. BROWN, a citizen of the United States, residing at Oakland, county of Alameda, and State of California, administratrix of the estate of JOHN G. HANKS, late a citizen of the United States, deceased, do hereby make application for patent on certain new and useful Improvements in Registering Mechanism for Range-Finders, invented by the said JOHN G. HANKS, of which the following is a specification.

This invention relates to an improvement in registering mechanism for range finders, and is a divisional part of application for Letters Patent, filed by John G. Hanks, deceased, December 17, 1907, Serial No. 406,915.

In the accompanying drawings:—

Figure 1:
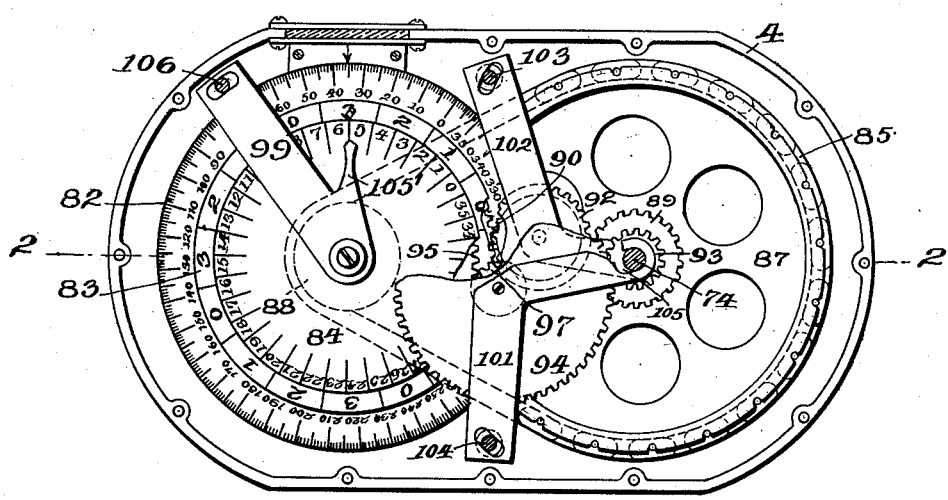
Figure 1 is a view indicating the reading mechanism, showing the scales by which angles are indicated, the front cover being removed.

The mechanism consists of a plurality of rotative disks 82, 83 and 84 of graduated sizes and concentrically mounted, as shown, and provided around their outer edges with scales to denote revolutions and parts of revolutions of the spindle 74 to which these disks are geared, and by which they are driven.

The rear or larger disk 82 is driven by pitch-chain 85 that connects the wheel 87 keyed on the main spindle 74 with a pinion 88 attached to the disk 82, its size being so proportioned to the wheel 87 that the disk 82 indicates fourths of revolutions of the spindle 74, that is to say the former makes four revolutions to one of the latter. The disk 82 is marked with three hundred and sixty divisions, corresponding to degrees of a circle as shown in the drawings.

The second disk 83, attached to the toothed wheel 86, is geared to the spindle 74 by the spur-wheels 89, 90 and 92, an extra wheel being required to reverse the course of revolution. The proportion of the first and last movers being as forty to one hundred and sixty, so the disk 83 makes one-fourth as many revolutions as the spindle 74, and has a scale in four divisions, as shown in Fig. 1.

The outer or front disk 84 is attached to the toothed wheel 95, and is driven from the spindle 74 by pinion 93 thereon, the intermediate wheel 94 and the pinion 97 making the proportion of revolutions of this disk to that of the spindle 74 as thirty-six to one, each figure or division on its scale representing one revolution of the spindle 74, or as it may be called, one unit of movement of the arm 8 and of the telescope 3.

Figure 4:
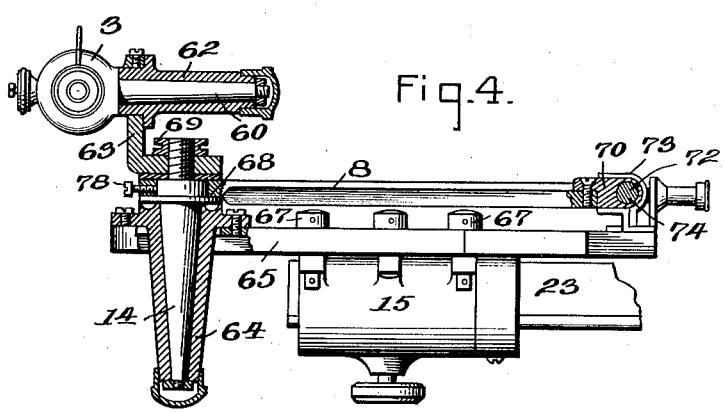
Fig. 4 is an enlarged side elevation partly in section of the movable telescope mountings and means of adjusting the same.

While this telescope may be mounted in any approved manner, it is shown pivoted horizontally on a spindle 60, fitting in the socket piece 62, see Fig. 4, held in a bracket 63, attached to the top of a spindle 14, which latter is held in the socket-piece 64 fastened to a bar 65, that is in turn bolted to a sleeve 15 by screws 67, which sleeve 15 is mounted on the main frame 23 of the range-finder. Near the top of the vertical spindle 14 is a collar 68, and above this a radial arm 8 to turn the spindle and telescope 3, the several parts at the top being clamped by a nut 69.

The arm or lever 8 has a toothed sector 70 at its outer end, into which meshes an accurately formed tangent-screw 72 covered and protected by a guard-plate 73. This tangent-screw 72 is an integral part of the spindle 74, so that, as the latter is turned, the disks 82, 83 and 84 and the telescope are simultaneously operated.

Figure 2:
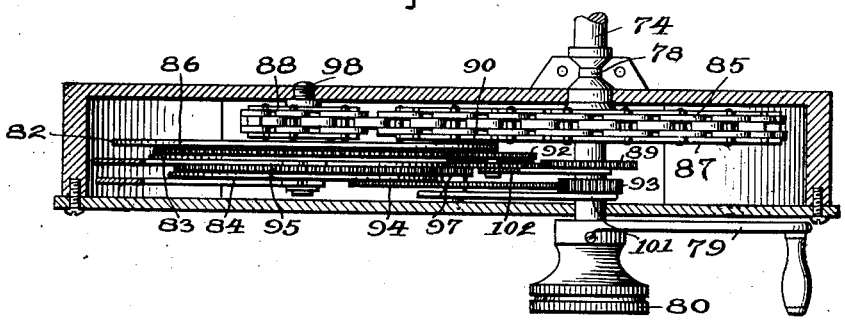
Fig. 2 is a horizontal longitudinal sectional view through the line 2—2 on Fig. 1.

The disks 82, 83 and 84 all turn loosely on the stud 98, see Fig. 2, and their readings are as follows: The front disk 84 indicates revolutions of the spindle 74; the second disk 83 indicates fourths of revolutions; and the third disk 82 indicates the revolutions of the spindle 74 in 1440th divisions, so that the register of any angle or measurement made is expressed in revolutions, fourths of revolutions, and the 1440th parts of revolutions.

To prevent lost motion or inaccuracy of movement in the registering disks 83 and 84, the intermediate gear-wheels are provided that drive these disks on adjustable supports 101 and 102, which at their outer ends are held by the studs 103 and 104, and at their inner ends have elongated slots 105 to permit some movement on the spindle 74, upon which the supports are mounted. In this manner, the teeth of the intermediate gear-wheels 90, 92 and 97 can be set into mesh and adjusted in case there is any wear by use, so that movements right and left of the disks 83 and 84 will be accurate and will not vary.

The index-pointer 105' is made adjustable by means of an extension 99 slotted at its extremity and held by screw 106, as shown in Fig. 1.

Figure 3:
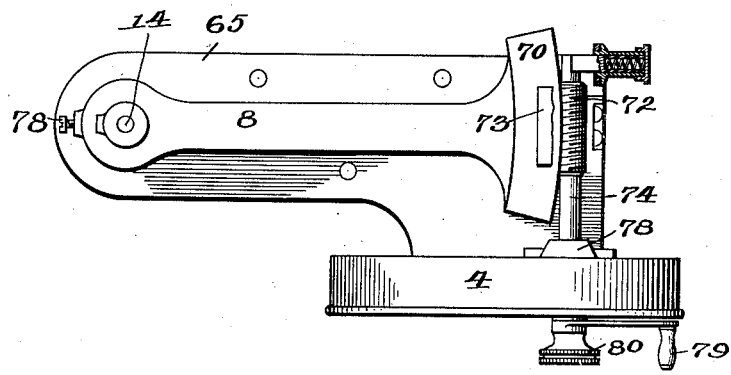
Fig. 3 is an enlarged plan view of the tangent-screw and connected parts for turning and adjusting the movable telescope, also of the case containing the reading or indicating mechanism.

The spindle 74 is turned by a crank 79 of a wheel 80. End movement of the spindle 74 is prevented by the bearing 78 which contains a beveled collar in the usual manner of such bearings, see Figs. 2 and 3. The numeral 4 indicates the case in which the registering mechanism is inclosed.

The register of the movement of the telescope 3 is observed through aperture 100 in the casing 4, as shown in Fig. 1, and is recorded in tables of reference when the instrument is experimentally calibrated, such record being carefully preserved for future use, so that distances can be accurately determined therefrom, so long as the instrument remains in true adjustment.

In the case of moving objects, such as vessels, after their distance shall have been ascertained, the movable telescope 3 can be slowly turned to coincide with the rate of their movement, and by comparing the arc described by the arm 8 with a period of time, the rate can be computed, the direction or angle of the object's movement being known or assumed.

I claim:

1. The combination of a plurality of disks, a spindle, a pitch-chain extending from the spindle to one disk, transmission-gears for imparting motion from the spindle to the other two disks, the disks having scales thereon showing whole and multiple revolutions of the spindle and fractions thereof.

2. The combination of a plurality of disks, a spindle, a pitch-chain extending from the spindle to one disk, transmission-gears for imparting motion from the spindle to the other two disks, the disks having scales thereon showing whole and multiple revolutions of the spindle and fractions thereof, adjustable supports pivotally mounted concentric with the spindle and carrying certain of said transmission-gears, said supports having elongated slots, and studs passing through said slots for holding the supports in their adjusted positions.

In testimony whereof, I affix my signature, as administratrix of the estate of John G. Hanks, deceased.

ELIZA P. BROWN,

*Administratrix of the estate of John G. Hanks, deceased.*